United States Patent
Hou et al.

(10) Patent No.: US 8,631,366 B2
(45) Date of Patent: Jan. 14, 2014

(54) INTEGRATED CIRCUIT DESIGN USING DFM-ENHANCED ARCHITECTURE

(75) Inventors: Yung-Chin Hou, Taipei (TW); Lee-Chung Lu, Taipei (TW); Li-Chun Tien, Tainan (TW); Yi-Kan Cheng, Taipei (TW); Chun-Hui Tai, Hsin-Chu (TW); Ta-Pen Guo, Cupertino, CA (US); Yuan-Te Hou, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 556 days.

(21) Appl. No.: 12/708,242

(22) Filed: Feb. 18, 2010

(65) Prior Publication Data

US 2010/0281446 A1 Nov. 4, 2010

Related U.S. Application Data

(60) Provisional application No. 61/174,352, filed on Apr. 30, 2009.

(51) Int. Cl.
*G06F 17/50* (2006.01)
(52) U.S. Cl.
USPC ........................................................ 716/110
(58) Field of Classification Search
USPC .................................................. 716/100, 110
See application file for complete search history.

(56) References Cited

U.S. PATENT DOCUMENTS

| | | | |
|---|---|---|---|
| 7,055,121 B1* | 5/2006 | Bolander et al. | 716/113 |
| 7,939,858 B2* | 5/2011 | Nakanishi | 257/206 |
| 2004/0268288 A1* | 12/2004 | Bajuk et al. | 716/16 |
| 2005/0044522 A1* | 2/2005 | Maeda | 716/18 |
| 2006/0138464 A1* | 6/2006 | Shimamura | 257/204 |
| 2006/0190908 A1* | 8/2006 | Bajuk et al. | 716/18 |
| 2006/0253810 A1* | 11/2006 | Guardiani et al. | 716/4 |
| 2007/0164317 A1* | 7/2007 | Nakanishi | 257/206 |
| 2009/0289308 A1* | 11/2009 | Nakanishi | 257/374 |
| 2009/0319977 A1* | 12/2009 | Saxena et al. | 716/13 |
| 2010/0155783 A1* | 6/2010 | Law et al. | 257/206 |
| 2011/0061037 A1* | 3/2011 | Croysdale et al. | 716/122 |

* cited by examiner

*Primary Examiner* — Suchin Parihar
(74) *Attorney, Agent, or Firm* — Slater & Matsil, L.L.P.

(57) ABSTRACT

Integrated circuit libraries include a first standard cell having a first left boundary and a first right boundary, and a second standard cell having a second left boundary and a second right boundary. The first standard cell and the second standard cell are of a same cell variant. A first active region in the first standard cell has a different length of diffusion than a second active region in the second standard cell. The first active region and the second active region are corresponding active regions represented by a same component of a same circuit diagram representing both the first standard cell and the second standard cell.

33 Claims, 4 Drawing Sheets

INTEGRATED CIRCUIT DESIGN USING DFM-ENHANCED ARCHITECTURE

This application claims the benefit of U.S. Provisional Application No. 61/174,352 filed on Apr. 30, 2009, entitled "Integrated Circuit Design using DFM-Enhanced Architecture," which application is hereby incorporated herein by reference.

TECHNICAL FIELD

This invention relates generally to integrated circuit design, and more particularly to design-for-manufacturing (DFM) aware standard cell libraries, and to the methods for designing integrated circuits using the DFM aware standard cell libraries.

BACKGROUND

Conventionally, in the design of digital circuits, particularly application-specific integrated circuits (ASIC), standard cells are often pre-designed and saved in cell libraries. At the time integrated circuits (applications) are designed, the standard cells are retrieved from the cell libraries, and placed to desirable locations. Routing is then performed to connect the standard cells with each other, and with other customized circuits on the same chip.

With the advancement of integrated manufacturing processes, design-for-manufacturing (DFM) effects become more significant. For example, the length of diffusion (LOD) significantly affects the performance of the integrated circuits. However, existing ASIC design methods do not adequately take the DFM effects into account. Currently, the DFM effects are not considered during placement and route stages at all. After the placement and route stages are finished, the analysis of the resulting circuit may involve the consideration of some DFM effects. However, at this stage, it is too late to change the circuit to take full advantage of the DFM effects.

SUMMARY OF THE INVENTION

In accordance with one aspect of the present invention, integrated circuit libraries include a first standard cell having a first left boundary and a first right boundary, and a second standard cell having a second left boundary and a second right boundary. The first standard cell and the second standard cell are of a same cell variant. A first active region in the first standard cell has a different length of diffusion than a second active region in the second standard cell. The first active region and the second active region are corresponding active regions represented by a same component of a same circuit diagram representing both the first standard cell and the second standard cell.

Other embodiments are also disclosed.

The advantageous features of the present invention include improved performance of integrated circuits, reduced power consumption in the integrated circuits, and reduced manufacturing cost.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

A novel design-for-manufacturing (DFM) aware standard cell libraries in accordance with an embodiment of the present invention is provided. A method of designing integrated circuits using the DFM-aware standard cell library is also provided. The variations of the embodiment are discussed. Throughout the various views and illustrative embodiments of the present invention, like reference numbers are used to designate like elements.

FIGS. 1A through 1D schematically illustrate the layouts (top views) of standard cells of different DFM types. It is to be noted that although the cells shown in FIGS. 1A through 1D are shown as having one transistor only, they can have any number of transistors. Also, for simplicity, contact plugs and metal routing of the standard cells are not illustrated. Further, the standard cell shown in FIGS. 1A through 1D may represent any type of standard cells including, but not limited to, inverters, NAND gates, NOR gates, buffers, and the like. Each of standard cells 10 (denoted as 10A through 10D) has left boundary 10_1, right boundary 10_2, top boundary 10_3, and bottom boundary 10_4. Gate electrode strips 12 (including active gate electrode strips 12_1 acting as the gates of transistors and dummy gate strips 12_2 not acting as the gate of any transistor) may be formed as parallel lines extending from top boundary 10_3 to bottom boundary 10_4.

Figure 1A:
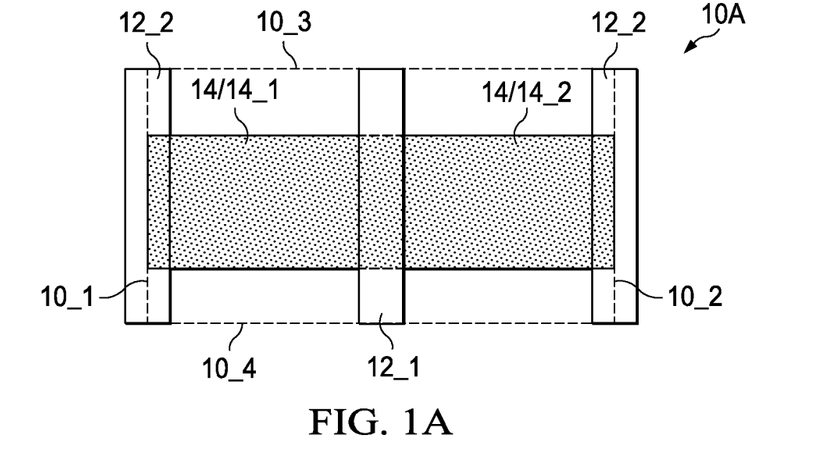
FIGS. 1A through 1D schematically illustrate standard cells belonging to a same cell variant and of different design-for-manufacturing (DFM) types.

In FIG. 1A, active regions 14, which may be the diffusion regions including source and drain regions and the channel region between the source and drain regions, extend all the way to left boundary 10_1 and right boundary 10_2. Active regions 14 have edges overlapping left boundary 10_1 and right boundary 10_2. It is noted that most of the standard cells may include more than one transistor. For example, as shown in FIGS. 2A through 2D, inverter 20 may include PMOS transistor 22 and NMOS transistor 26. Accordingly, active region 24 of PMOS transistor 22 and active region 28 of NMOS transistor 26 all extend to both left boundary 10_1 and right boundary 10_2. However, its is possible that only one of active regions 24 and 28 extend to left boundary 10_1, and only one of active regions 24 and 28 extend to right boundary 10_2. Also, the active regions on the left side of standard cell 10A (and other standard cells) do not necessarily belong to same transistors as the active regions on the right side.

Figure 1B:
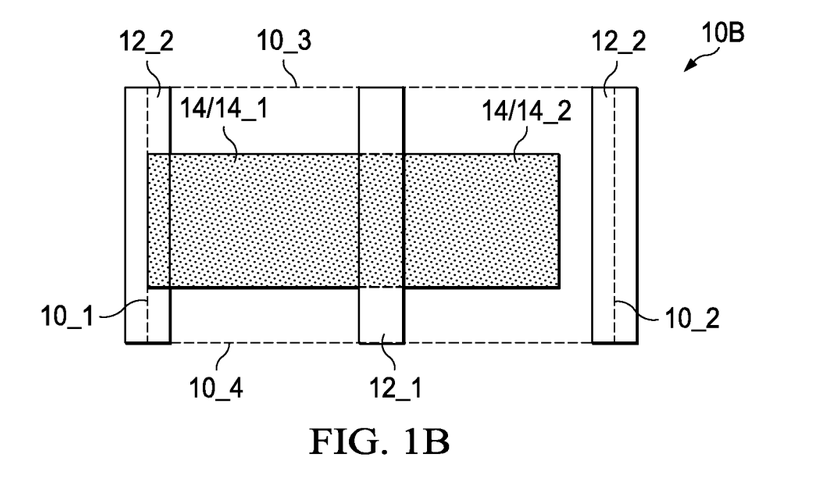
Figure 1C:
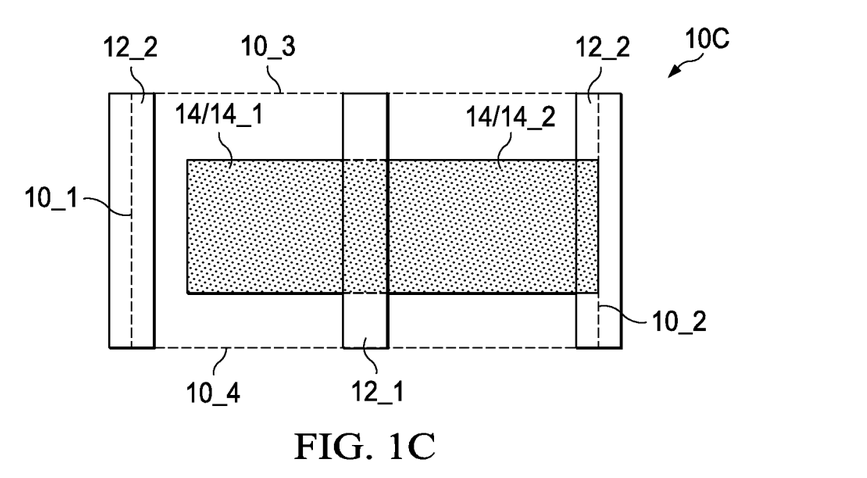

In FIG. 1B, source region(s) 14_1 extend to left boundary 10_1, while drain region(s) 14_2 is spaced apart from right boundary 10_2. In the inverter cell shown in FIG. 2B, all of source regions of PMOS transistor 22 and an NMOS transistor 26 on the left side of the cell will still reach left boundary 10_1, while drain regions of both PMOS transistor 22 and NMOS transistor 26 are spaced apart from right boundary 10_2. FIG. 1C is similar to FIG. 1B, except that drain region(s) 14_2 have edges aligned to right boundary 10_2, while source region(s) 14_1 are spaced apart left boundary 10_1.

Figure 1D:
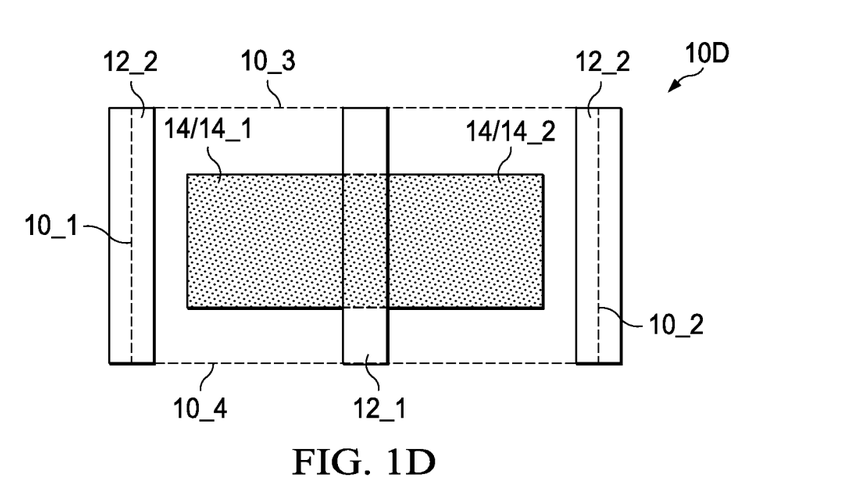

Accordingly, left boundary 10_1 may be a source-side boundary that only overlaps with edges of source regions of transistors, while right boundary 10_2 may be a drain-side boundary that only overlaps with edges of drain regions 14_2 of transistors. In FIG. 1D, the active regions on both the left side and the right side are spaced apart from the respective left boundary 10_1 and right boundary 10_2. Throughout the description, each of the type of cells shown in FIGS. 1A through 1D is referred to as a DFM type since these cells have different DFM effects. FIGS. 2A, 2B, 2C, and 2D illustrate exemplary embodiments of inverters corresponding to FIGS. 1A, 1B, 1C, and 1D, respectively.

Throughout the description, active regions 14_1 in FIGS. 1A through 1D are referred to as "corresponding" active regions, active regions 14_2 in FIGS. 1A through 1D are referred to as "corresponding" active regions. Similarly, active regions 24_1 in FIGS. 2A through 2D are referred to as "corresponding" active regions, active regions 24_2 in FIGS. 2A through 2D are referred to as "corresponding" active regions, active regions 28_1 in FIGS. 2A through 2D are referred to as "corresponding" active regions, and active regions 28_2 in FIGS. 2A through 2D are referred to as "corresponding" active regions. The standard cells in FIGS. 1A through 1D may be represented by a same circuit diagram, and the "corresponding" regions are a same region (source or drain) of a same transistor in the circuit diagram.

Figure 2A:
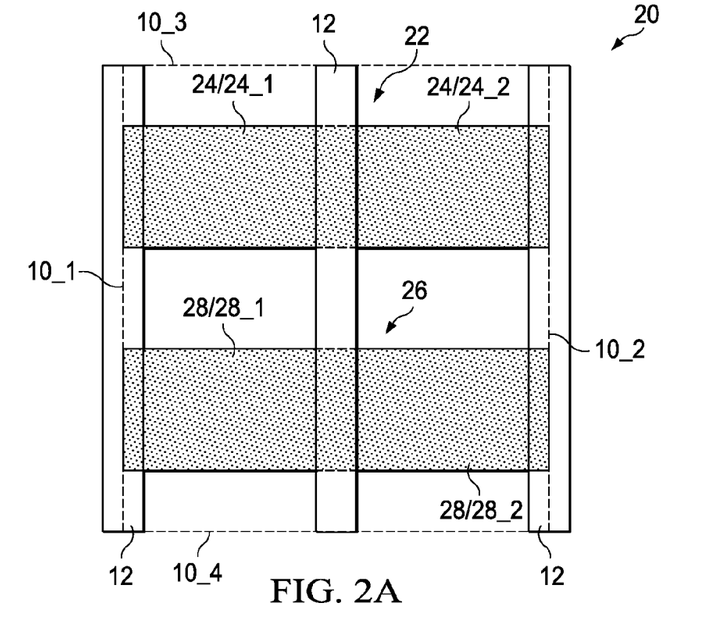
FIGS. 2A through 2D illustrate inverters of different design-for-manufacturing (DFM) types.
Figure 2B:
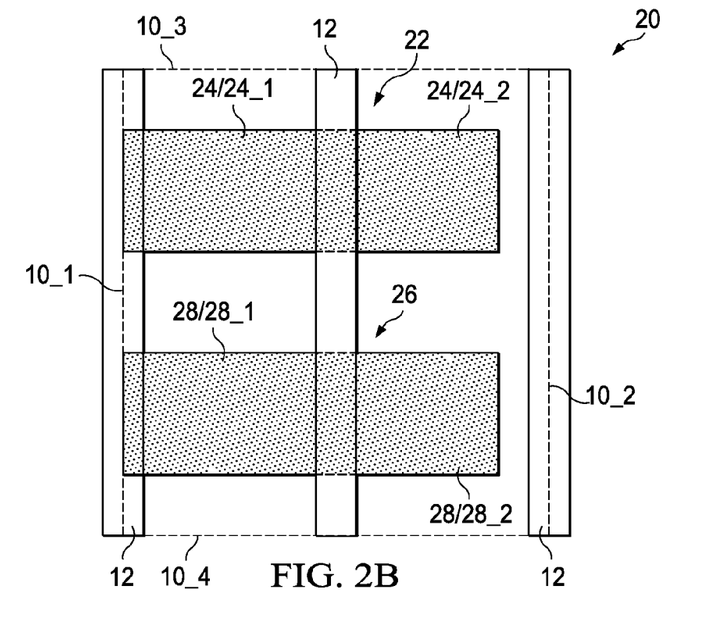
Figure 2C:
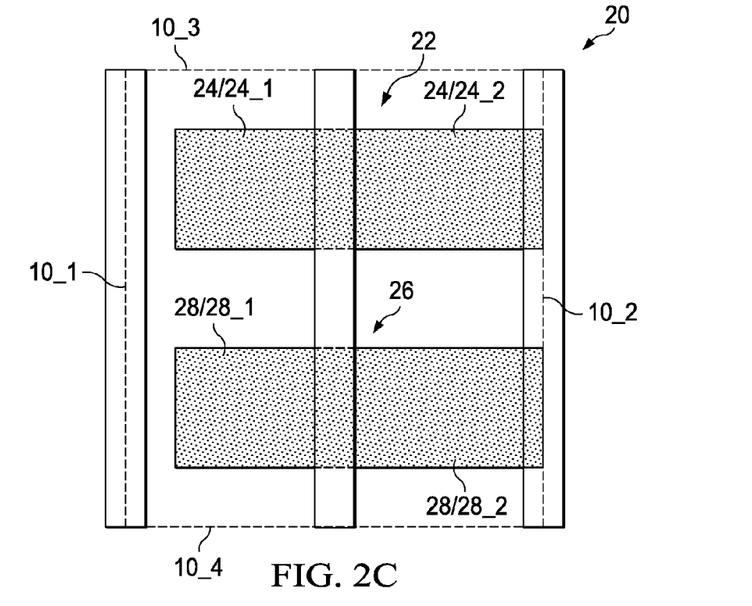
Figure 2D:
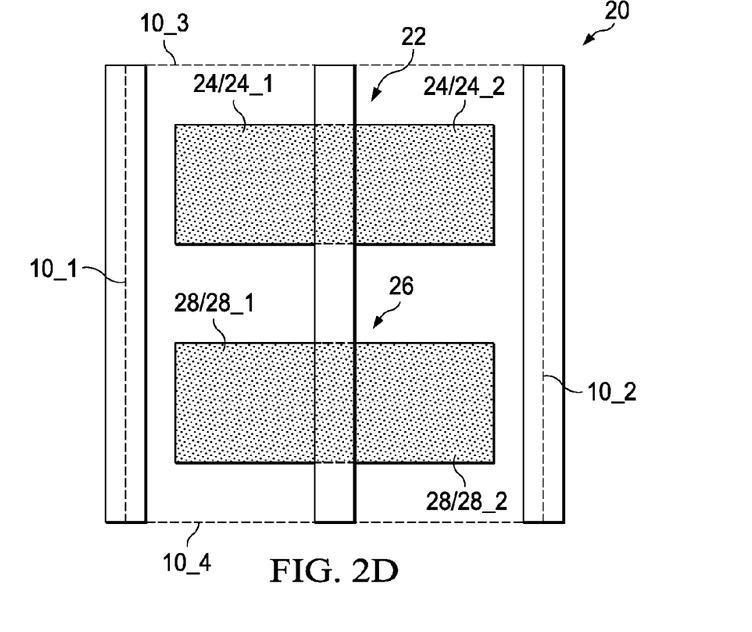

In a standard cell library in accordance with an embodiment, there are many types of standard cells such as inverters, NAND gates, NOR gates, buffers, or the like. Each type of standard cells may also have several versions of layouts having different sizes and different footprints indicated as size D1, size D2, size D3, size D4, or the like. Throughout the description, each size of each type of standard cell is referred to as a cell variant. Accordingly, inverter_D1 and inverter_D2 are different variants of the inverter cells. If, however, a type of standard cell (such as inverter) has only one size, the inverter cell has only one cell variant. Each cell variant may also have different DFM types such as above-indicated A type as shown in FIGS. 1A and 2A, B type as shown in FIGS. 1B and 2B, C type as shown in FIGS. 1C and 2C, and D type as shown in FIGS. 1D and 2D. It is realized that the exemplary embodiments shown in FIGS. 1A through 1D only take into account length-of-diffusion (LOD) effect, in which the diffusion region has different lengths. Additional DFM types may be added if other DFM effects, such as well-proximity effect, poly spacings, and the like, are considered. Accordingly, each cell variant may include more than four or more DFM types with different DFM effects.

In an embodiment, to incorporate different DFM types into DFM-aware standard cell libraries, while still keeping the DFM-aware standard cell libraries compatible with the existing design tools, a set of (standard cell) libraries may be created, with each library in the set of libraries used for storing the cells belonging to one of the DFM types. For example, in the above-discussed exemplary embodiment, four libraries may be generated, with the first library storing all standard cells belonging to DFM type A (FIGS. 1A and 2A), the second library storing all standard cells belonging to DFM type B (FIGS. 1B and 2B), the third library storing all standard cells belonging to DFM type C (FIGS. 1C and 2C), and the fourth library storing all standard cells belonging to DFM type D (FIGS. 1D and 2D). If there are more DFM types, additional sets of libraries may be generated. Further, each of the DFM-aware standard cell libraries in the library set may store only standard cells of a same DFM type.

Since standard cells of different DFM types have different effects to the timing and power consumption, the timing and power consumption may be characterized for each of the DFM types. The resulting timing and power consumption information may be stored in the libraries, and may be saved in a timing table and a power consumption table, respectively. For example, cell A may have the shortest timing (hence shortest delay) but highest power consumption, while cell D may have the longest timing but lowest power consumption. Cells of different DFM types, but are of a same cell variant (for example, inverters of size D1) may have a same footprint, that is, with the same cell size, and same pin locations so that they may be swapped easily. Design tools may thus select a cell of a specific DFM type according to its time and power consumption to maximize the performance of the integrated circuit.

In alternative embodiments, all of the standard cells belonging to different DFM types are stored in a single DFM-aware standard cell library. Therefore, in the above-discussed exemplary embodiment, the standard cells shown in FIGS. 1A through 1D are all stored in the same standard cell library. Since DFM effects are not only determined by the internal layout of a standard cell itself, but also determined by the external environment, the neighboring cells also affect the timing and consumption of the standard cell. For example, if a type-A cell abuts a type-D cell, the timing and power consumption of the type-A cell will be different than if the type-A cell abuts a type-A, type-B, or type-C cell. Accordingly, in the timing table of the standard cell library, a variable may be added to specify the DFM type of the neighboring cell, so that the timing of the standard cell may be associated not only to the DFM type of the standard cell itself, but also to the DFM type of its neighboring cells. Similarly, in the power consumption table of the standard cell library, a variable may be added to the power consumption table to specify the DFM type of the neighboring cell, so that the respective power consumption value may be associated not only to the DFM type of the standard cell itself, but also to the DFM type of its neighboring cells. With the addition of the variable, design tools may select a standard cell of an appropriate DFM type not only based on the time and power consumption requirements to the standard cell itself, but also based on the DFM type of its neighboring cells.

Table 1 illustrates exemplary placement constraints for placing standard cells of different DFM types.

TABLE 1

|    | AL | BL | AR | CR | CL | DL | BR | DR |
|----|----|----|----|----|----|----|----|----|
| AL | O  | O  | O  | O  | X  | X  | X  | X  |
| BL | O  | O  | O  | O  | X  | X  | X  | X  |
| AR | O  | O  | O  | O  | X  | X  | X  | X  |
| CR | O  | O  | O  | O  | X  | X  | X  | X  |
| CL | X  | X  | X  | X  | O  | O  | O  | O  |
| DL | X  | X  | X  | X  | O  | O  | O  | O  |
| BR | X  | X  | X  | X  | O  | O  | O  | O  |
| DR | X  | X  | X  | X  | O  | O  | O  | O  |

Wherein in Table 1, each of the column headers and row headers includes a first letter (A, B, C, or D) indicating the DFM type of the cell, and a second letter L or R indicating the left boundary or the right boundary of the standard cell. For example, AR means the right boundary of a DFM type-A cell. Letter O indicates the abutting is allowable, while letter X indicates the abutting is forbidden. Therefore, in the table, a letter O corresponding to row header AL and column header BL indicates that it is allowable to abut the left boundary of a first cell of DFM type A to a left boundary of a second cell of DFM type B. In this case, one of the first and the second cells may need to be flipped so that their left boundaries can be abutted. Please note that any of the first cell and the second cell can be of any cell variant, for example, any one of an inverter, NAND gate, or NOR gate. On the other hand, a letter X corresponding to row AL and column CL indicates that it is not allowable to abut the left boundary of a first cell of DFM type A to the left boundary of a second cell of DFM type C.

It is observed that with the placement constraint listed in Table 1, not only existing design rules are followed, the timing and power consumption are also taken into account to simplify the design. For example, although the DFM effect of a cell is also affected by the DFM type of neighboring cells of the cell in addition to its internal layout, with the above design constraints, it can be assumed that the timing and power consumption of each of DFM types A, B, C, and D varies in a same range without considering whether the neighboring cell is a type-A, a type-B, a type-C or a type-D cell. This is achieved by disallowing some of the abutting. For example, for a type-A cell, its timing and power consumption are substantially the same regardless whether it abuts a type-A, a type-B, or a type-C cell. However, the timing and consumption of the type-A cell will change significantly if it abuts a type-D cell rather than a type-A, type-B, or type-C cell. Accordingly, in Table 1, the abutting of a type-A cell to a type-D cell is disallowed. Therefore, it can safely discount the external environment of the cell. This makes more accurate calculation of timing possible without incurring excess effort.

It is appreciated that the placement constraints in Table 1 are only one of the various possible embodiment, in alternative exemplary embodiments, some of the non-allowable abutting in Table 1 may be allowed. This case is more complicated since the timing and power consumption of a standard cell are not only associated to the DFM type of the standard cell itself, but also to the DFM type of its neighboring cell(s). In this case, the above-discussed additional variable associated with a standard cell in the timing table and power consumption table may specify the type of its neighboring cells. One standard cell, therefore, depending on its neighboring cells, may have different time and/or power consumption.

During the placement of standard cells, the placement tool may invoke a performance optimization tool and an analysis tool to evaluate the performance of circuits and to optimize the placement. The performance optimization tool and the analysis tool understand the format of the DFM-aware library, so that it may find the optimum standard cell of the right DFM type. For example, in each of the steps of the placement, the placement tool may inquiry the performance optimization tool and analysis tool to find out which DFM type is optimal. The placement tool may also need to follow the placement constraints such as what are shown in Table 1.

Further, since the external environment of a standard cell affects its timing and power consumption, a standard cell also affects (influences) its neighbors. It is considered that each of the standard cells has its radius of influence, which means whether it affects the timing and power consumption of its immediate neighboring cells (level-1 neighboring cells), the immediate neighboring cells (level-2 neighboring cells) of the level-1 neighboring cells, or even level-3, level-4 neighboring cells. Some standard cells have greater radius of influence than other. During the placement, special consideration may be taken, so that not only the immediate neighboring cells are considered, cells further than the immediate neighboring cells may also need to be considered in the performance analysis. Accordingly, DFM-aware libraries and corresponding timing and power consumption tables of a standard cell need to reflect the DFM type of level-1 and level-2 neighboring cells, with each of the level-1 and level-2 neighboring cells corresponding to an additional variable in the timing and power consumption tables.

During and after the placement, cells of different DFM types may be swapped to further improve the performance and to reduce the power consumption of the circuit. For example, in time-critical paths, the standard cells already placed in a circuit may be swapped with standard cells having shorter timing, such as DFM type-A cells, which may have shortest timing (although greater leakage) among the four DFM types. On the other hand, in non-time-critical paths, the standard cells may be swapped with standard cells having lower power consumption, such as DFM type-D cells, which may have lowest power consumption (although longer timing) among the four DFM types. The swapped standard cells need to belong to a same cell variant. By such cell-swapping between cells of different DFM types, the performance of the integrated circuit may be improved, while the power consumption may also be reduced. To reduce the overhead of the swapping, cells of a same cell variant may have the same footprint, that is, the same cell size and same pin locations.

The benefit of the embodiments of the present invention may be demonstrated by comparing the timing of some typical standard cells. If the cell ring delay of a cell ring formed of DFM type-D inverters is noted as time T, then the cell ring delay of a cell ring formed of DFM type-A inverters is 0.85 T, while the cell ring delay of a cell ring formed of DFM type-B inverters and DFM type-C inverters are 0.91 T and 0.92 T, respectively. Therefore, by swapping a DFM type-D inverter with a DFM type-A inverter, a 15 percent performance improvement can be achieved.

The embodiments of the present invention have several advantageous features. The performance of integrated circuits, with the DFM effects taken into consideration of the design, is optimized. The improvement in the performance, however, does not result in the sacrifice of power consumption, and vice versa. As a matter of fact, the power consumption can also be reduced. Experiment results have shown that if a circuit is formed of all DFM type-A cells, the operation frequency of the circuit is 1.064 GHz, and the leakage is 1.3563 mW. The same circuit, when manufactured using standard cells of appropriate combination of DFM types A, B, C, and D, the leakage may be reduced to 0.8920 mW, while the operation frequency is still the same.

In conventional circuit design, without considering DFM effects, the cell characterization has to be conservative. For example, when estimating the timing, the estimation may need to be based on DFM type-D cells. In the embodiments of the present invention, the timing of each of the DFM types is already built in the cell libraries. The timing calculation is thus more accurate.

A further advantageous feature is that the embodiments of the present invention may fit into existing design flow without increasing the manufacturing cost, and without requiring the excess effort of the designer. For example, conventionally, to reduce leakage current, cells with different threshold voltage (Vt) may need to be swapped. However, this requires additional manufacturing cost such as additional doping steps. The embodiments of the present invention do not require any additional process step, and hence the manufacturing cost is minimized.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. In addition, each claim constitutes a separate embodiment, and the combination of various claims and embodiments are within the scope of the invention.

What is claimed is:

1. A non-transitory computer-readable medium comprising integrated circuit libraries, which when executed by a computer, is configured to produce a circuit by the computer, wherein the integrated circuit libraries comprise:
   a first standard cell comprising a first left boundary and a first right boundary; and
   a second standard cell comprising a second left boundary and a second right boundary, wherein the first standard cell and the second standard cell are of a same cell variant, wherein a first active region in the first standard cell has a different length of diffusion than a second active region in the second standard cell, the first active region extends to the first left boundary or the first right boundary, and the first active region and the second active region are corresponding active regions represented by a same component of a same circuit diagram representing both the first standard cell and the second standard cell.

2. The integrated circuit libraries of claim 1, wherein the first active region extends to a first boundary selected from a first source-side boundary and a first drain-side boundary, and the second active region is spaced apart from a second boundary selected from a second source-side boundary and a second drain-side boundary, and wherein the first boundary and the second boundary are on a same side of the respective first standard cell and the second standard cell.

3. The integrated circuit libraries of claim 1, wherein:
   the first standard cell comprises the first active region having an edge overlapping the first left boundary, and the second first active region having a second edge overlapping the first right boundary;
   the second standard cell comprises a third active region having an edge overlapping the second left boundary, wherein no active region in the second standard cell has any edge overlapping the second right boundary, and wherein the integrated circuit libraries further comprise:
   a third standard cell comprising:
      a third left boundary and a third right boundary; and
      a fourth active region having an edge overlapping the third right boundary, wherein no active region in the third standard cell has any edge overlapping the third left boundary; and
   a fourth standard cell comprising a fourth left boundary and a fourth right boundary, wherein no active region in the fourth standard cell has any edge overlapping any of the fourth left boundary and the fourth right boundary, and wherein the first, the second, the third, and the fourth standard cells are of a same cell variant.

4. The integrated circuit libraries of claim 3, wherein the first active region and the third active region are corresponding regions, and wherein the second active region and the fourth active region are corresponding regions.

5. The integrated circuit libraries of claim 3 comprising four libraries, wherein each of the first, the second, the third, and the fourth standard cells is in one of the four libraries.

6. The integrated circuit libraries of claim 3 further comprising a timing table and a power consumption table, wherein each of the first, the second, the third, and the fourth standard cells has a timing information in the timing table, and a power consumption information in the power consumption table.

7. The integrated circuit libraries of claim 3, wherein the first, the second, the third, and the fourth standard cells are in a same library, and wherein the same library comprises a timing table and a power consumption table, each comprising a variable corresponding to a design-of-manufacturing (DFM) type of an additional standard cell neighboring the respective first, second, third, and fourth standard cells.

8. A non-transitory computer-readable medium comprising integrated circuit libraries, which when executed by a computer, is configured to produce a circuit by the computer, wherein the integrated circuit libraries comprise:
   a collection of standard cells, each comprising a left boundary and a right boundary, wherein the collection of standard cells comprises:
      a first plurality of standard cells of a first design-for-manufacturing (DFM) type, wherein each of the first plurality of standard cells comprises an active region having a first edge overlapping a respective left boundary, and an active region having a second edge overlapping a respective right boundary;
      a second plurality of standard cells of a second DFM type, wherein each of the second plurality of standard cells comprises an active region having an edge overlapping a respective left boundary, and no active region with any edge overlapping a respective right boundary;
      a third plurality of standard cells of a third DFM type, wherein each of the third plurality of standard cells comprises an active region having an edge overlapping a respective right boundary, wherein no active region having any edge overlapping a respective left boundary; and
      a fourth plurality of standard cells of a fourth DFM type, wherein no active region in any of the fourth plurality of standard cells has any edge overlapping any of a respective left boundary and a respective right boundary.

9. The integrated circuit libraries of claim 8, wherein the collection of standard cells belongs to a plurality of cell variants, with each of the plurality of cell variants comprising a first standard cell of the first DFM type, a second standard cell of the second DFM type, a third standard cell of the third DFM type, and a fourth standard cell of the fourth DFM type.

10. The integrated circuit libraries of claim 9, wherein the collection of standard cells comprises an inverter, an NAND gate, and a NOR gate as different cell variants.

11. The integrated circuit libraries of claim 8 comprising a first library, a second library, a third library, and a fourth library, wherein the first plurality of standard cells, the second plurality of standard cells, the third plurality of standard cells, and the fourth plurality of standard cells are stored in the first library, the second library, the third library, and the fourth library, respectively.

12. The integrated circuit libraries of claim 8, wherein all of the collection of standard cells are stored in a same library.

13. The integrated circuit libraries of claim 12, wherein the same library comprises a timing table and a power consumption table, wherein each of the collection of standard cells is associated to a first item in the timing table and a second item in the power consumption table, and wherein each of the first item and the second item comprises a variable indicating a DFM type of a standard cell abutting the each of the collection of standard cells.

14. The integrated circuit libraries of claim 8, wherein the left boundary is a source-side boundary, and the right boundary is a drain-side boundary.

15. An integrated circuit structure comprising:
a plurality of standard cells, each comprising a left boundary and a right boundary, wherein the integrated circuit comprises at least two of:
a first standard cell comprising a first active region having a first edge overlapping a left boundary of the first standard cell, and a second active region having a second edge overlapping a right boundary of the first standard cell;
a second standard cell comprising a third active region having an edge overlapping a left boundary of the second standard cell, and no active region with any edge overlapping a right boundary of the second standard cell;
a third standard cell comprising a fourth active region having an edge overlapping a right boundary of the third standard cell, and no active region with any edge overlapping a left boundary of the third standard cell; and
a fourth standard cell with no active region having any edge overlapping any of a left boundary and a right boundary of the fourth standard cell, wherein the first, the second, the third, and the fourth standard cells are of a same cell variant.

16. The integrated circuit structure of claim 15, wherein the same cell variant is selected from the group consisting essentially of an inverter, an NAND gate, and a NOR gate.

17. The integrated circuit structure of claim 15 comprising all of the first, the second, the third, and the fourth standard cells.

18. The integrated circuit structure of claim 15, wherein:
no cell in the form of the first standard cell abuts any cell in the form of the fourth standard cell; and
no cell in the form of the second standard cell has a left boundary abutting any cell in the form of the fourth standard cell, wherein the left boundary is a source-side boundary.

19. A method of forming an integrated circuit, the method comprising:
providing integrated circuit libraries comprising a plurality of standard cells of a plurality of design-for-manufacturing (DFM) types, and wherein a first standard cell and a second standard cell of the plurality of standard cells are of a same cell variant and are of different DFM types, the first standard cell comprises a first left boundary and a first right boundary, the second standard cell comprises a second left boundary and a second right boundary, a first active region in the first standard cell has a different length of diffusion than a second active region in the second standard cell, the first active region extends to the first left boundary or the first right boundary, and the first active region and the second active region are corresponding active regions represented by a same component of a same circuit diagram representing both the first standard cell and the second standard cell; and
placing the plurality of standard cells to form the integrated circuit.

20. The method of claim 19, wherein the step of placing comprises:
determining a DFM type of a first standard cell already placed in the integrated circuit;
selecting a second standard cell from the plurality of standard cells based on the DFM type of the first standard cell; and
placing the second standard cell abutting the first standard cell.

21. The method of claim 19, wherein the integrated circuit libraries comprise a timing information for each of the plurality of standard cells, and wherein the method further comprises:
retrieving the timing information of the each of the plurality of standard cells; and
performing a performance analysis on the integrated circuit using the timing information.

22. The method of claim 19 further comprising, after a first standard cell of a first one of the plurality of DFM types is placed, replacing the first standard cell with a second standard cell, wherein the second standard cell is of a second one of the plurality of DFM types different from the first one.

23. The method of claim 22, wherein the first standard cell is in a timing-critical path of the integrated circuit, and wherein the second standard cell has a shorter timing than the first standard cell.

24. The method of claim 23, wherein active regions of the second standard cell extend to both a left boundary and a right boundary of the first standard cell, and no active region of the first standard cell extends to any of a left boundary and a right boundary of the second standard cell.

25. The method of claim 22, wherein the first standard cell is in a non-timing-critical path of the integrated circuit, and wherein the second standard cell has a lower power consumption than the first standard cell.

26. The method of claim 25, wherein active regions of the second standard cell extend to both a left boundary and a right boundary of the first standard cell, and no active region of the first standard cell extends to any of a left boundary and a right boundary of the second standard cell.

27. The method of claim 22, wherein the step of replacing the first standard cell with the second standard cell further comprises:
determining a DFM type of a third standard cell already placed in the integrated circuit and abutting the first standard cell; and
checking placement constraints based on the DFM type of the third standard cell to determine the allowability to place the second standard cell abutting the third standard cell.

28. A method of forming an integrated circuit, the method comprising:
providing integrated circuit libraries comprising a collection of standard cells, each comprising a left boundary and a right boundary, wherein the collection of standard cells comprises:
a first plurality of standard cells of a first design-for-manufacturing (DFM) type, wherein each of the first plurality of standard cells comprises an active region having a first edge overlapping a respective left boundary, and an active region having a second edge overlapping a respective right boundary;
a second plurality of standard cells of a second DFM type, wherein each of the second plurality of standard cells comprises an active region having an edge overlapping a respective left boundary, and no active region with any edge overlapping a respective right boundary;

a third plurality of standard cells of a third DFM type, wherein each of the third plurality of standard cells comprises an active region having an edge overlapping a respective right boundary, wherein no active region having any edge overlapping a respective left boundary; and a fourth plurality of standard cells of a fourth DFM type, wherein no active region in any of the fourth plurality of standard cells has any edge overlapping any of a respective left boundary and a respective right boundary;

placing a first standard cell in the integrated circuit; and placing a second standard cell into the integrated circuit, wherein the first standard cell abuts the second standard cell.

29. The method of claim 28, wherein the step of placing the second standard cell comprises selecting the second standard cell based on the DFM type of a first standard cell.

30. The method of claim 28, wherein the integrated circuit libraries comprise a timing information for each of the collection of standard cells, and wherein the method further comprises, before the step of placing the second standard cell, performing a performance analysis based on DFM types of both the first standard cell and the second standard cell.

31. The method of claim 28 further comprising, after the second standard cell is placed, replacing the second standard cell with a third standard cell of a different DFM type than a DFM type of the second standard cell, wherein the second standard cell and the third standard cell belong to a same cell variant.

32. The method of claim 31, wherein the second standard cell is in a timing-critical path of the integrated circuit, and wherein the second standard cell is of the fourth DFM type, and the third standard cell is of the first DFM type.

33. The method of claim 31, wherein the second standard cell is in a non-timing-critical path of the integrated circuit, and wherein the second standard cell is in of the first DFM type, and the third standard cell is of the fourth DFM type.

* * * * *